(12) United States Patent
Chen et al.

(10) Patent No.: US 11,023,071 B1
(45) Date of Patent: Jun. 1, 2021

(54) DRIVING SYSTEM AND METHOD OF TOUCH DISPLAY PANEL

(71) Applicant: FocalTech Systems Co., Ltd., Hsinchu (TW)

(72) Inventors: Yi-Chiung Chen, Hsinchu (TW); Jui-Lung Hung, Hsinchu (TW); Chien-Hao Cheng, Hsinchu (TW); Po-Sheng Shih, Hsinchu (TW)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 0 days.

(21) Appl. No.: 17/004,944

(22) Filed: Aug. 27, 2020

(30) Foreign Application Priority Data

Jul. 6, 2020 (TW) .................................. 109122759

(51) Int. Cl.
*G06F 3/041* (2006.01)
*G09G 3/20* (2006.01)

(52) U.S. Cl.
CPC ............. *G06F 3/0416* (2013.01); *G09G 3/20* (2013.01); *G09G 2310/0267* (2013.01); *G09G 2310/08* (2013.01); *G09G 2320/0233* (2013.01)

(58) Field of Classification Search
CPC ................... G06F 3/0416; G09G 3/20; G09G 2310/0267; G09G 2310/08; G09G 2320/0233
See application file for complete search history.

(56) References Cited

U.S. PATENT DOCUMENTS

2017/0192573 A1* 7/2017 Kim ...................... G06F 3/0446

FOREIGN PATENT DOCUMENTS

KR        20170126351 A   * 11/2017

* cited by examiner

*Primary Examiner* — Michael Pervan
(74) *Attorney, Agent, or Firm* — Muncy, Geissler, Olds and Lowe, P.C.

(57) ABSTRACT

A driving system of touch display panel includes a panel having an active area and a plurality of touch electrodes, and a gate driving circuit connected with a plurality of gate lines. There is at least one gate line not covered by the touch electrodes among the gate lines disposed in a range constituted by vertically adjacent touch electrodes. The gate line not covered by the touch electrode, at least one gate line previous thereto, and at least one gate line next thereto are selected as the gate lines that influence coupling. When driving the gate lines that influence coupling, the gate driving circuit enables a time difference between an active time of each at least one gate line among the gate lines that influence coupling and an active time of a gate line previous thereto to be greater than a predetermined interval.

16 Claims, 5 Drawing Sheets

DRIVING SYSTEM AND METHOD OF TOUCH DISPLAY PANEL

CROSS REFERENCE TO RELATED APPLICATION

This application claims the benefits of the Taiwan Patent Application Serial Number 109122759, filed on Jul. 6, 2020, the subject matter of which is incorporated herein by reference.

BACKGROUND

1. Field of the Disclosure

The present disclosure relates to a driving system and method of touch display panel and, more particular, to a driving system and method of touch display panel that is capable of avoiding mura caused by the gaps between touch electrodes.

2. Description of Related Art

The structure of the existing in-cell touch display panel is constituted by cutting the common electrode layer (VCOM), which is intact over the entire layer originally, into a plurality of touch electrodes. As shown in FIG. 1, because of the common electrode layer 12 being cut into a plurality of touch electrodes 11, there exists an area not being covered by the common electrode layer 12. This area will cause the pixels of the touch display panel to have different loadings. When driving the gate lines, those gate lines that are not covered by the common electrode layer (such as G[i]) and those gate lines that are still covered by the common electrode layer (such as G[i−1)], G[i+1], etc.) may generate different amount of coupling that causes a difference in the amount of coupling between the cut common electrode layers, resulting in a mura phenomenon. Especially for a touch display panel with GOA (Gate driver On Array), as shown in FIG. 2, gate driving is performed by scanning gate lines with a fixed interval, so that two consecutive gate lines are continuously turned on and a time difference between the two active times is preset to be one horizontal offset (1H). Due to the longer output width (8H) of the gate driving voltage of the gate line, the amount of coupling caused by the adjacent gate lines to the common electrode layer of the panel is relatively large. Therefore, for the area that is not covered by the common electrode layer, it is more likely to cause a difference in display compared with other areas that are covered by the common electrode layer.

Therefore, it is desirable to provide an improved driving system and method for touch display panel to mitigate and/or obviate the aforementioned mura problem caused by cutting the common electrode layer into a plurality of touch electrodes.

SUMMARY

The object of the present invention is to provide a driving system and method of touch display panel, in which the gate driving circuit performs driving with non-fixed interval so as to avoid mura caused by the gaps between touch electrodes.

In one aspect, there is provided a driving system of touch display panel, which includes: a panel having an active area and a plurality of touch electrodes arranged in a matrix form on the active area; a gate driving circuit connected to a plurality of gate lines sequentially arranged on the active area to provide gate driving voltages for performing driving, wherein, among the gate lines disposed within a range constituted by vertically adjacent touch electrodes, there is at least one gate line not covered by the touch electrodes, and the gate line not covered by the touch electrodes, at least one gate line previous thereto, and at least one gate line next thereto are selected as gate lines that influence coupling, wherein, when driving the gate lines that influence coupling, the gate driving circuit enables a time difference between an active time of each of at least one gate line among the gate lines that influence coupling and an active time of a gate line previous thereto to be greater than a predetermined time interval, and a time difference between an active time of each of remaining gate lines that influence coupling and an active time of a gate line previous thereto to be equal to the predetermined interval.

In another aspect, there is provided a method for driving a touch display panel. The touch display panel includes a panel having an active area, a plurality of touch electrodes arranged in a matrix form on the active area, and plurality of gate lines sequentially arranged on the active area, wherein, among the gate lines disposed within a range constituted by vertically adjacent touch electrodes, there is at least one gate line not covered by the touch electrodes. The method includes: selecting the gate line not covered by the touch electrodes, at least one gate line previous thereto, and at least one gate line next thereto as gate lines that influence coupling; and sequentially driving the gate lines disposed within a range constituted by vertically adjacent touch electrodes, wherein, when driving the gate lines that influence coupling, the gate driving circuit enables a time difference between an active time of each of at least one gate line among the gate lines that influence coupling and an active time of a gate line previous thereto to be greater than a predetermined time interval, and a time difference between an active time of each of remaining gate lines that influence coupling and an active time of a gate line previous thereto to be equal to the predetermined interval.

Other objects, advantages, and novel features of the disclosure will become more apparent from the following detailed description when taken in conjunction with the accompanying drawings.

DETAILED DESCRIPTION

The following embodiments describe the implementation and operation principles of the present disclosure. Those skilled in the art to which the present disclosure pertains may understand the features and effects of this disclosure through the aforementioned embodiments, and may perform combination, modification, replacement or adaption based on the spirit of the present disclosure.

Figure 1:
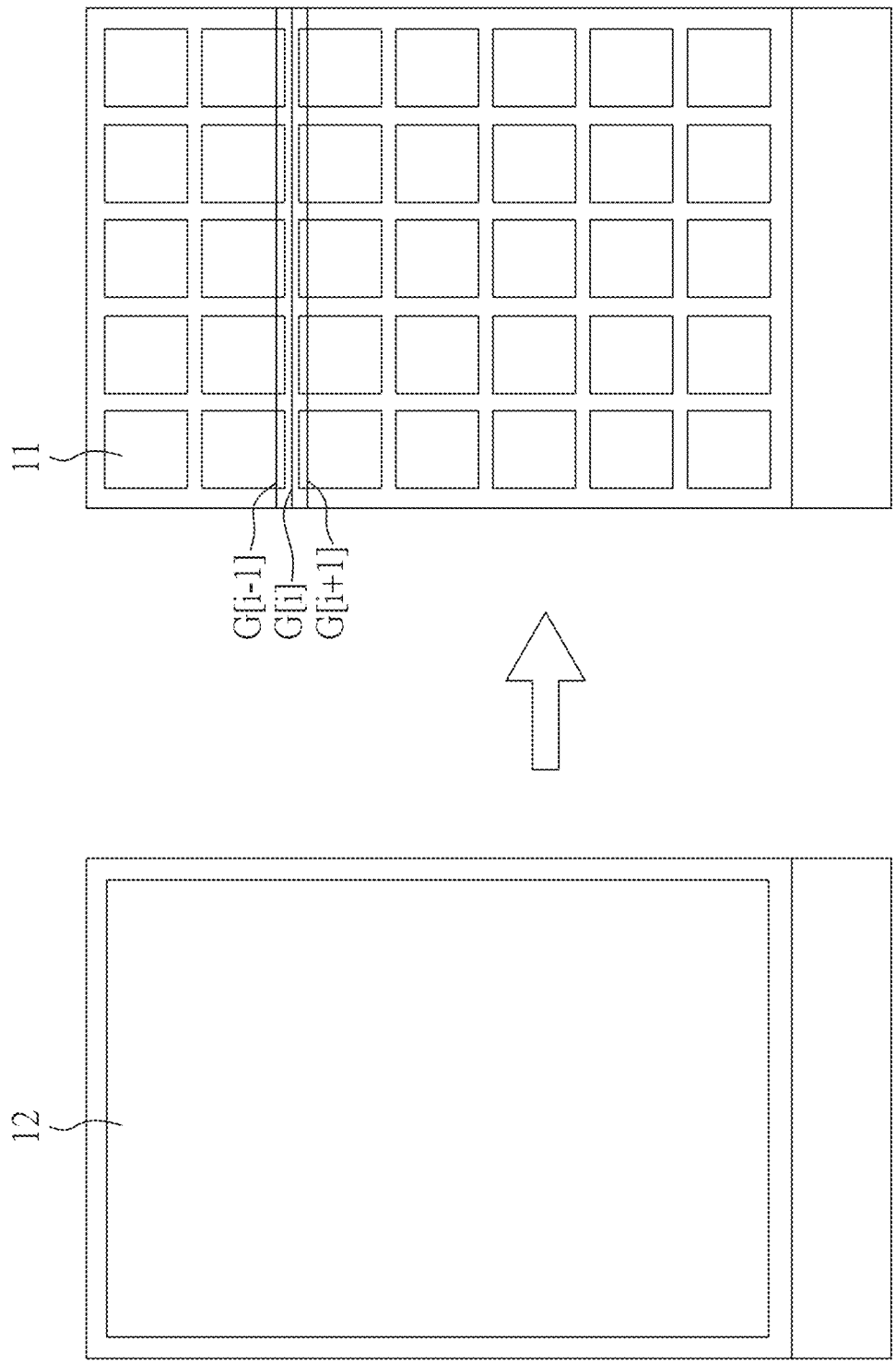
FIG. 1 schematically illustrates the structure of a touch display panel in which a common electrode layer, which is originally intact over the entire layer, is cut into a plurality of touch electrodes.
Figure 2:
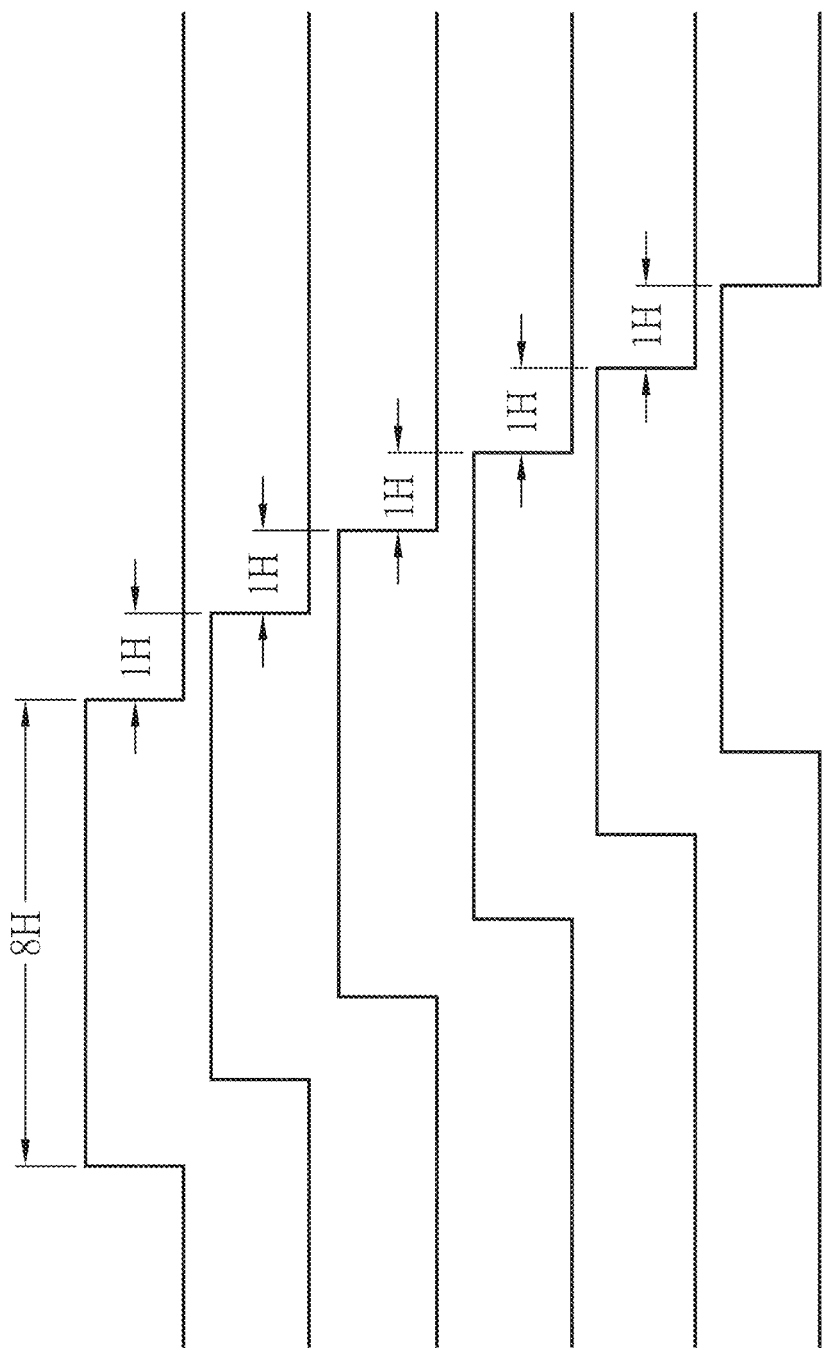
FIG. 2 is a gate driving timing diagram of a touch display panel with GOA.
Figure 3:
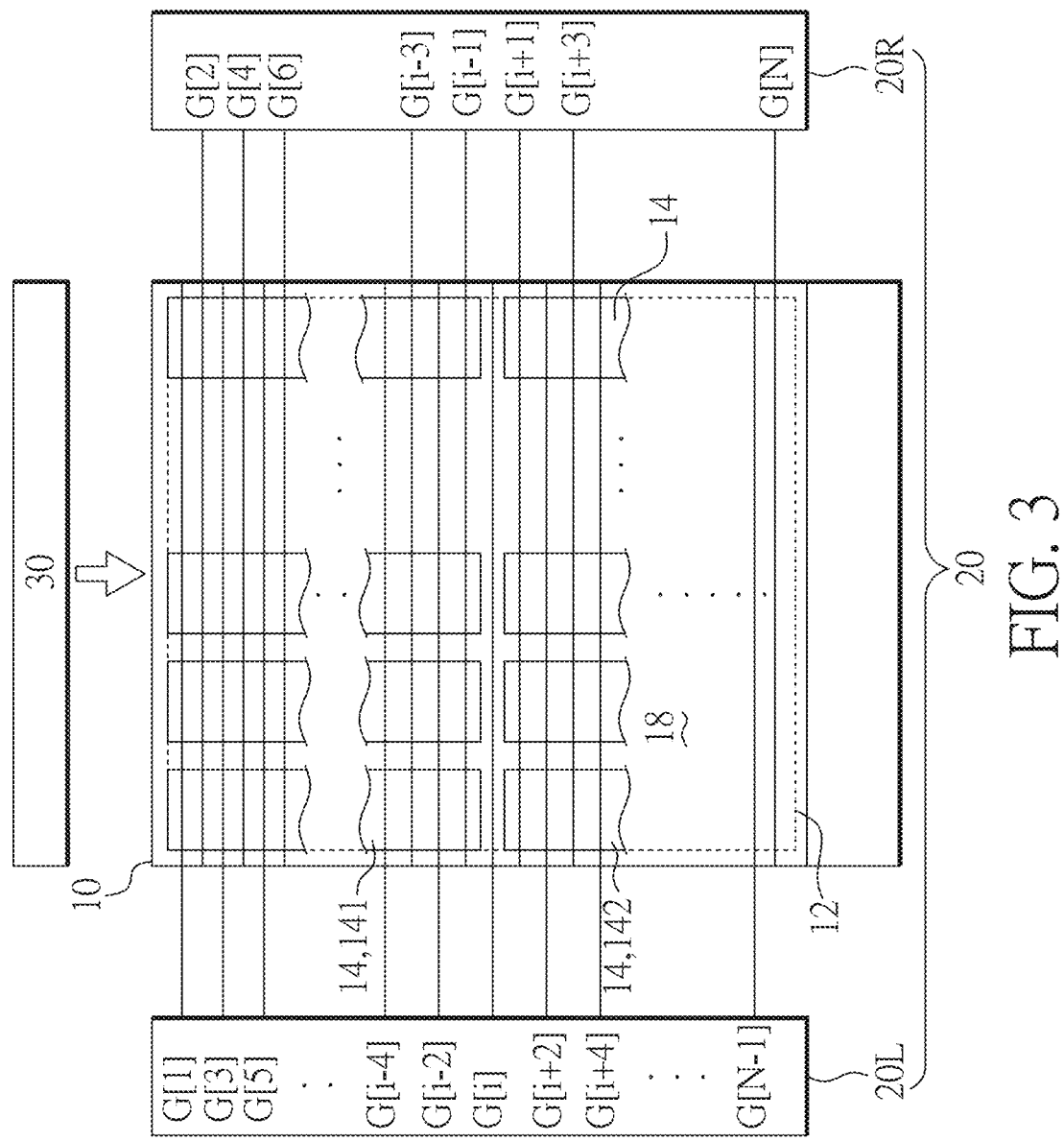
FIG. 3 schematically illustrates the driving system of touch display panel of the present disclosure.

FIG. 3 schematically illustrates the driving system of touch display panel of the present disclosure, which includes a panel 10, a gate driving circuit 20 and a source driving circuit 30. The panel 10 is, for example, a touch display panel. The panel 10 has an active area 18 for display or touch control, and the common electrode layer 12 of the panel 10 is cut into a plurality of touch electrodes 14. The plurality of touch electrodes 14 are arranged in a matrix form on the active area 18 of the panel 10, and each touch electrode 14 has, for example, a rectangular shape. The gate driving circuit 20 may be an integrated circuit chip connected to the panel 10 or may be circuit directly fabricated on the panel 10. The gate driving circuit 20 is connected with a plurality of gate lines G[1]~G[N] to provide gate driving voltages for performing driving. The gate lines G[1]~G[N] are arranged on the active area 18 of the panel 10 from top to bottom. The gate driving circuit 20 sequentially drives the plurality of gate lines G[1]~G[N], and the source driving circuit 30 provides data voltages for the panel 10 to display data.

In the embodiment of FIG. 3, the gate driving circuit 20 is divided into a left gate driving circuit 20L and a right gate driving circuit 20R respectively disposed on the left side and the right side of the active area 18 of the panel 10. The left gate driving circuit 20L provides gate driving voltages with the plurality of odd-numbered gate lines G[1], G[3], G[5] . . . G[N-5], G[N-3], G[N-1], and the right gate driving circuit 20R provides gate driving voltages with the plurality of even-numbered gate lines G[2], G[4], G[6] . . . G[N-4], G[N-2], G [N]. However, in other embodiments, the gate driving circuit 20 of the present disclosure may be a single circuit provided only on one side of the panel 10, and provides gate driving voltages for performing driving with the plurality of gate lines G[1], G[2], G[3] . . . G[N-2], G[N-1], G[N].

As shown in FIG. 3, since the common electrode layer 12 of the panel 10 is cut into a plurality of touch electrodes 14 that results in an area not covered by the common electrode layer 12, part of the gate lines G[1]~G[N] of the gate driving circuit 20 is located in this uncovered area (i.e. not covered by vertically adjacent touch electrodes 14), and thus is not covered by the common electrode layer 12. That is, part of the gate lines on the active area 18 of the panel 10 is covered by the touch electrodes 14, and part of the gate lines is not covered by the touch electrodes 14. According to the display resolution and touch resolution of the panel 10, among the gate lines disposed within a range constituted by vertically adjacent touch electrodes 141, 142, there will be at least one gate line G[i] that is not covered by the common electrode layer.

With the aforementioned driving system of touch display panel, in order to avoid or mitigate the occurrence of mura phenomenon, in the driving method of touch display panel of the present disclosure, instead of performing driving by fixed interval scanning in which two consecutive gate lines are continuously turned on with a time difference of a predetermined interval (1H), the gate driving circuit 20 selects a gate line G[i] not covered by the vertically adjacent touch electrodes 141, 142, at least one gate line (G[i-1] . . . ) previous to the uncovered gate line G[i], and at least one gate line (G[i+1] . . . ) next to the uncovered gate line G[i] as target gate lines that influence coupling to the common electrode layer 12, so that, among the target gate lines that influence the coupling, a time difference between an active time of each of at least one target gate line and an active time of its previous gate line is greater than a predetermined time interval, so as to reduce the influence of the gate lines on the coupling of the common electrode layer 12, while a time difference between an active time of each of the remaining target gate lines and an active time of its previous gate line is equal to the predetermined time interval. The predetermined interval is the horizontal offset (1H) between two consecutive gate lines being continuously turned on, as known in the prior gate driving method with fixed interval scanning.

Figure 4:
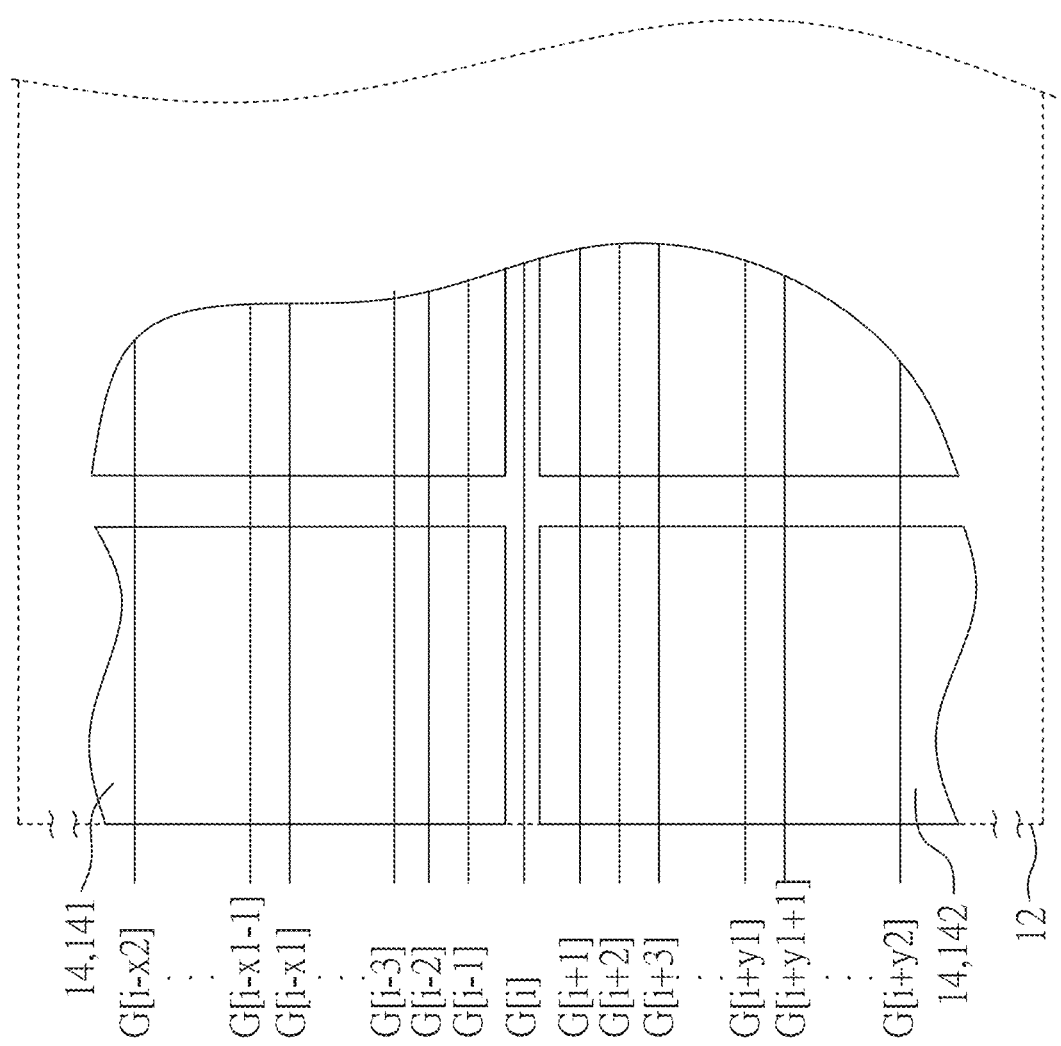
FIG. 4 schematically illustrates a gate line not covered by the common electrode layer, a plurality of gate lines previous to the uncovered gate line, and a plurality of gate lines next to the uncovered gate line.

FIG. 4 schematically illustrates a gate line G[i] not covered by the common electrode layer 12 (touch electrode 14), a plurality of gate lines G[i-1], G[i-2], G[i-3] . . . G[i-x2] . . . previous to the uncovered gate line G[i], and a plurality of gate lines G[i+1], G[i+2], G[i+3] . . . G[i+y2] . . . next to the uncovered gate line G[i], wherein i is an index value between 1 and N, x2 and y2 are each a positive integer greater than 0, gate lines G[i-1]~G[i-x2] are directly covered by the touch electrode 141 located immediately above the gate line G [i], and gate lines G[i+1]~G[i+y2] are directly covered by the touch electrode 142 located immediately below the gate line G [i].

For the gate lines G[i-x2] . . . G[i-x1] . . . G[i-3], G[i-2], G[i-1], G[i], G[i+1], G[i+2], G[i+3] . . . G[i+y1] . . . G[i+y2] shown in FIG. 4, in the driving method of touch display panel of the present disclosure, the gate line G[i] that is not covered by the common electrode layer 12 (touch electrodes 14) is used as a reference to select the gate line G[i], at least one gate line (G[i-1]~G[i-x1]) previous to the gate line G[i], and at least one gate line (G[i+1]~G[i+y1]) next to the gate line G[i] as target gate lines that influence the coupling, where x1, y1 are each a positive integer greater than 0, x1 is less than x2, and y1 is less than y2.

The driving method of touch display panel of the present disclosure is provided to sequentially drive a plurality of gate lines G[i-x2]~G[i+y2]. When driving the plurality of gate lines G[i-x2]~G[i-x1-1], the gate driving circuit 20 enables the time difference between the active time of each of the gate lines G[i-x2]~G[i-x1-1] and the active time of its previous gate line to be equal to the predetermined time interval. When driving the plurality of gate lines G[i-x1]~G[i+y1], the gate driving circuit 20 enables the time difference between the active time of each of at least one gate line among the gate lines G[i-x1]~G[i+y1] and the active time of its previous gate line to be greater than the predetermined time interval, for example, to be twice the predetermined time interval, while a time difference between an active time of each of the remaining gate lines in the (x1+y1+1) gate lines G[i-x1]~G[i+y1] and an active time of its previous gate line is equal to the predetermined time interval. When driving a plurality of gate lines G[i+y1+1]~G[i+y2], the gate driving circuit 20 enables the time difference between the active time of each of the gate lines G[i+y1+1]~G[i+y2] and the active time of its previous gate line to be equal to the predetermined time interval.

Specifically, in the driving method of touch display panel according to one embodiment of the present disclosure, x1 is equal to 1 and y1 is equal to 1. That is, when driving three gate lines G[i-1], G[i], G[i+1], among the three gate lines G[i-1], G[i], G[i+1], the time difference between the active time of each of at least one gate line (in which at least one gate line can be, for example, the gate line G[i-1], the gate line G[i], the gate line G[i+1], the gate lines G[i-l] and G[i], the gate lines G[i] and G[i+1], or the gate lines G[i-1]~G[i+1]) and the active time of its previous gate line is greater than the predetermined time interval, which may be, for example, twice the predetermined time interval, while the time difference between the active time of each of the remaining gate lines in the three gate lines G[i−1], G[i], G[i+1] and the active time of its previous gate line is equal to the predetermined time interval.

Figure 5:
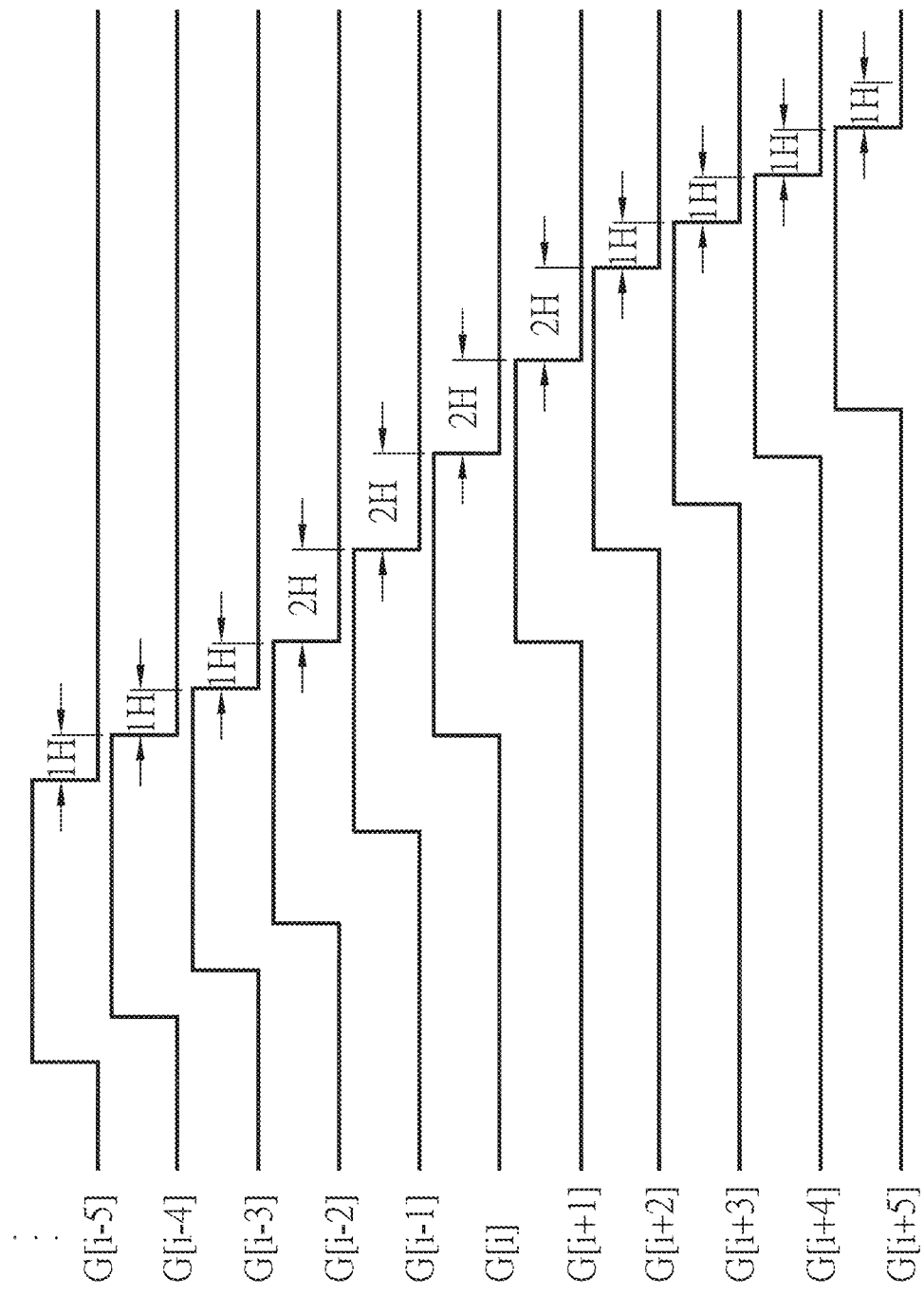
FIG. 5 is a driving timing diagram of the driving method of touch display panel according to the present disclosure.

In the driving method of touch display panel according to another embodiment of the present disclosure, when driving a plurality of gate lines G[i−x2]~G[i−x1−1], the gate driving circuit 20 enables the time difference between the active time of each of the gate lines G[i−x2]~G[i−x1−1] and the active time of its previous gate line to be equal to the predetermined time interval. When driving a plurality of gate lines G[i−x1]~G[i+y1], the gate driving circuit 20 enables the time difference between the active time of each of the (x1+y1+1) gate lines G[i−x1]~G[i+y1] and the active time of its previous gate line to be greater than the predetermined time interval, for example, to be twice the predetermined time interval. When driving a plurality of gate lines G[i+y1+1]~G[i+y2], the gate driving circuit 20 enables the time difference between the active time of each of the gate lines G[i+y1+1]~G[i+y2] and the active time of its previous gate line to be equal to the predetermined time interval. FIG. 5 shows a driving timing for the driving method of this embodiment, wherein x1 is equal to 1, y1 is equal to 2, x2 is equal to 5 or can be an integer greater than 5, and y2 is equal to 5 or can also be an integer greater than 5.

In addition, in the aforementioned embodiments, since the gate driving circuit 20 performs driving by scanning gate lines with non-fixed interval, the timing of the source driving circuit 30 for providing the data voltages is modified accordingly so as to correctly display data on the active area 18 of the panel 10, which can be understood by those skilled in the art based on the disclosure of the present invention, and thus a detailed description therefor is deemed unnecessary.

In summary, since the gate driving circuit performs driving by scanning gate lines with non-fixed interval, by prolonging the time difference between active times of the gate lines around vertically adjacent touch electrodes, the recovery time after coupling the common electrode layer is sufficient, so as to effectively reduce the amount of coupling of the gate lines to the common electrode layer, thereby enabling the common electrode layer to have better stability and alleviating the mura phenomenon caused by uneven load on the common electrode layer.

The aforementioned embodiments are examples only for convenience of description. The scope of the present disclosure is claimed hereinafter in the claims and is not limited to the embodiments.

What is claimed is:

1. A driving system of touch display panel, comprising:
a panel having an active area and a plurality of touch electrodes arranged in a matrix form on the active area;
a gate driving circuit connected to a plurality of gate lines sequentially arranged on the active area to provide gate driving voltages for performing driving, wherein, among the gate lines disposed within a range constituted by vertically adjacent touch electrodes, there is at least one gate line not covered by the touch electrodes, and the gate line not covered by the touch electrodes, at least one gate line previous thereto, and at least one gate line next thereto are selected as gate lines that influence coupling,
wherein, when driving the gate lines that influence coupling, the gate driving circuit enables a time difference between an active time of each of at least one gate line among the gate lines that influence coupling and an active time of a gate line previous thereto to be greater than a predetermined time interval, and a time difference between an active time of each of remaining gate lines that influence coupling and an active time of a gate line previous thereto to be equal to the predetermined time interval.

2. The driving system of touch display panel as claimed in claim 1, wherein the gate driving circuit enables the time difference between the active time of each of at least one gate line among the gate lines that influence coupling and the active time of the gate line previous thereto to be twice the predetermined time interval.

3. The driving system of touch display panel as claimed in claim 1, wherein, when driving the gate lines disposed in the range constituted by vertically adjacent touch electrodes except the gate lines that influence coupling, the gate driving circuit enables a time difference between an active time of each of the gate lines and an active time of a gate line previous thereto to be equal to the predetermined time interval.

4. The driving system of touch display panel as claimed in claim 1, wherein the gate line not covered by the touch electrodes, a gate line previous thereto, and a gate line next thereto are selected as gate lines that influence coupling.

5. The driving system of touch display panel as claimed in claim 4, wherein the gate driving circuit enables a time difference between an active time of each of at least one gate line among the three gate lines that influence coupling and an active time of a gate line previous thereto to be greater than the predetermined time interval.

6. The driving system of touch display panel as claimed in claim 5, wherein the gate driving circuit enables the time difference between the active time of each of at least one gate line among the three gate lines that influence coupling and the active time of the gate line previous thereto to be twice the predetermined time interval.

7. The driving system of touch display panel according to claim 1, wherein, when driving the gate lines that influence coupling, the gate driving circuit enables a time difference between an active time of each of the gate lines that influence coupling and an active time of a gate line previous thereto to be greater than the predetermined time interval and, when driving the gate lines disposed in the range constituted by vertically adjacent touch electrodes except the gate lines that influence coupling, the gate driving circuit enables a time difference between an active time of each of the gate lines and an active time of a gate line previous thereto to be equal to the predetermined time interval.

8. The driving system of touch display panel as claimed in claim 7, wherein, when driving the gate lines that influence coupling, the gate driving circuit enables the time difference between the active time of each of the gate lines that influence coupling and the active time of the gate line previous thereto to be twice the predetermined time interval.

9. A method for driving a touch display panel including a panel having an active area, a plurality of touch electrodes arranged in a matrix form on the active area, and plurality of gate lines sequentially arranged on the active area, wherein, among the gate lines disposed within a range constituted by vertically adjacent touch electrodes, there is at least one gate line not covered by the touch electrodes, the method comprising:
selecting the gate line not covered by the touch electrodes, at least one gate line previous thereto, and at least one gate line next thereto as gate lines that influence coupling; and
sequentially driving the gate lines disposed within a range constituted by vertically adjacent touch electrodes, wherein, when driving the gate lines that influence coupling, the gate driving circuit enables a time difference between an active time of each of at least one gate line among the gate lines that influence coupling and an active time of a gate line previous thereto to be greater than a predetermined time interval, and a time difference between an active time of each of remaining gate lines that influence coupling and an active time of a gate line previous thereto to be equal to the predetermined interval.

10. The method as claimed in claim 9, wherein, when driving the gate lines that influence coupling, the time difference between the active time of each of at least one gate line among the gate lines that influence coupling and the active time of the gate line previous thereto is twice the predetermined time interval.

11. The method as claimed in claim 9, wherein, when driving the gate lines disposed in the range constituted by vertically adjacent touch electrodes except the gate lines that influence coupling, a time difference between an active time of each of the gate lines and an active time of a gate line previous thereto is equal to the predetermined time interval.

12. The method as claimed in claim 9, wherein the gate line not covered by the touch electrodes, a gate line previous thereto, and a gate line next thereto are selected as gate lines that influence coupling.

13. The method as claimed in claim 12, wherein, when driving the gate lines that influence coupling, a time difference between an active time of each of at least one gate line among the three gate lines that influence coupling and an active time of a gate line previous thereto is greater than the predetermined time interval.

14. The method as claimed in claim 13, wherein, when driving the gate lines that influence coupling, the time difference between the active time of each of at least one gate line among the three gate lines that influence coupling and the active time of the gate line previous thereto is twice the predetermined time interval.

15. The method as claimed in claim 9, wherein, when driving the gate lines that influence coupling, a time difference between an active time of each of the gate lines that influence coupling and an active time of a gate line previous thereto is greater than the predetermined time interval and, when driving the gate lines disposed in the range constituted by vertically adjacent touch electrodes except the gate lines that influence coupling, a time difference between an active time of each of the gate lines and an active time of a gate line previous thereto is equal to the predetermined time interval.

16. The method as claimed in claim 15, wherein, when driving the gate lines that influence coupling, the time difference between the active time of each of the gate lines that influence coupling and the active time of the gate line previous thereto is twice the predetermined time interval.

\* \* \* \* \*